Figure 1:
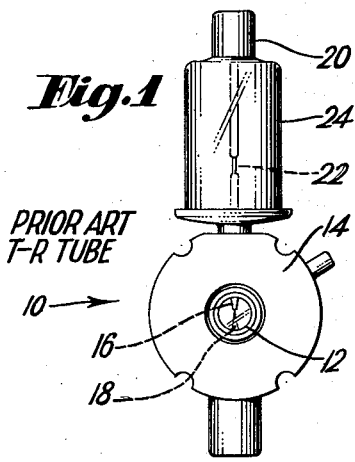

May 11, 1954  L. W. ROBERTS  2,678,408
HIGH-FREQUENCY TRANSMISSION CONTROL TUBE
Filed July 21, 1950
T-R TUBE
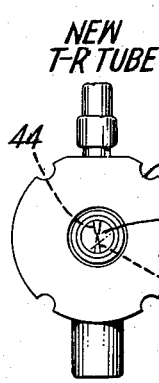
Fig.2
NEW
T-R TUBE
INVENTOR
LOUIS W. ROBERTS
BY *Paul S. Martin*
ATTORNEY

UNITED STATES PATENT OFFICE 2,678,408

HIGH-FREQUENCY TRANSMISSION CONTROL TUBE

Louis W. Roberts, Roxbury, Mass., assignor to Sylvania Electric Products Inc., a corporation of Massachusetts Application July 21, 1950, Serial No. 175,071

1 Claim. (Cl. 315—41)

This invention is concerned with gaseous electronic devices especially such as are used for controlling the transmission of high frequency energy in wave guides.

Devices of this class as they are now generally made include a gas-filled resonator or resonant cavity having at least one window or dielectric-covered aperture for admission of high frequency energy from a waveguide. A pair of electrodes are provided within the cavity between which current can be caused to flow when the gas within the cavity is ionized. Such construction is common to several types of devices of this class including T-R (transmit-receive), A-T-R (anti-transmit-receive) and attenuator tubes. In the first two types, T-R and A-T-R, there is either complete breakdown and full conduction or virtually no conduction across a discharge gap; whereas, in the latter type, conduction can be varied in degree to provide controlled attenuation. The present invention provides an improved construction generally imparting longer life and superior ruggedness and compactness to such devices. The detailed disclosure that follows is directly to a T-R tube embodying the invention to which it is particularly applicable, but features of the invention will also be found applicable to similar devices.

In the device to be described, one wall contains a window, and that wall is extended generally in the plane of the window to provide a surface against which a waveguide flange is to be clamped. The waveguide and the window form a continuous passage for high-frequency energy. The body of the device is made hollow in the region bounded partly by this wall. The hollow chamber is connected by small apertures to the resonant cavity containing the discharge electrodes, and constitutes a reservoir for prolonging the useful life of the gas in the resonator. It is understood that the composition of the gas within the resonator is subject to change during operation due to selective absorption of some of its constituents and reaction of the gas with the metallic surfaces. The reservoir provides a greater volume of gas and thus stabilizes its composition for a longer operating period. In the present invention this reservoir is disposed outside the resonator but within the contour of the wall that contains the window, and the resonator is of metal. Deterioration of the gas that occurs within the resonator, caused by intense electric discharges, does not occur in the outer metallic reservoir.

The resonator communicates with the reservoir through plural openings through which, by a "pumping" action that occurs from each discharge to the next, causes circulation of the gas between the reservoir and the resonator. In this way the reservoir is more effectively utilized in achieving uniform operating characteristics.

Figure 4:
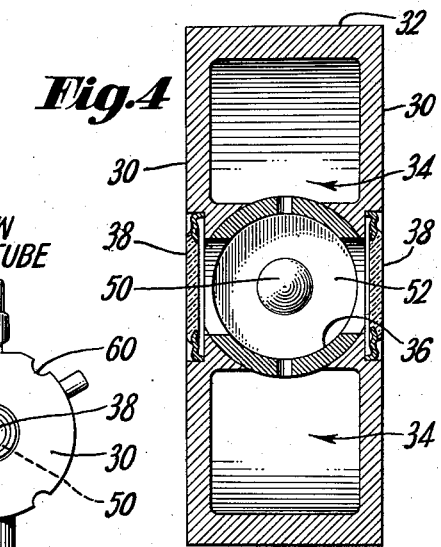
Figure 3:
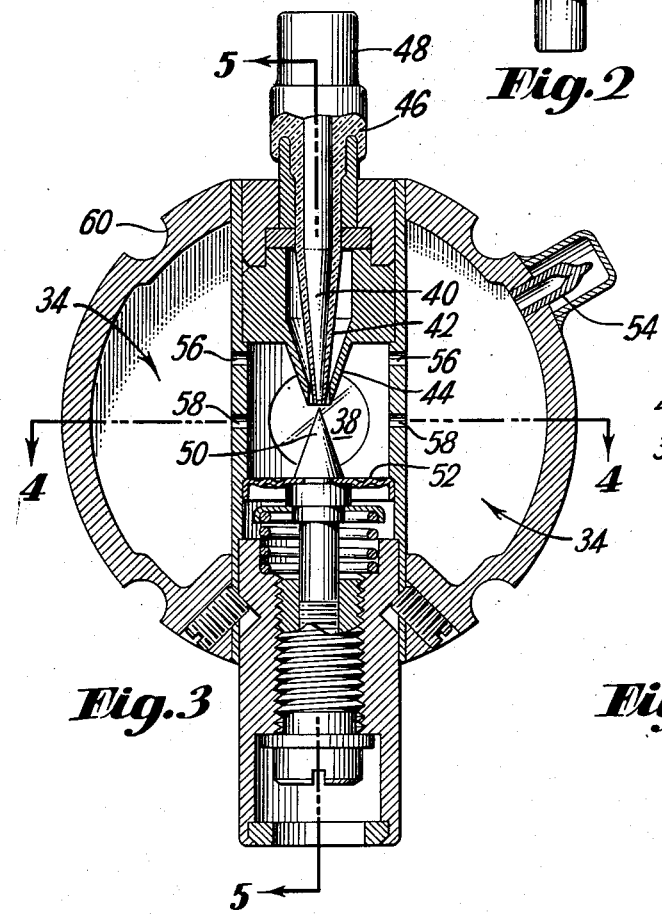
Figure 5:
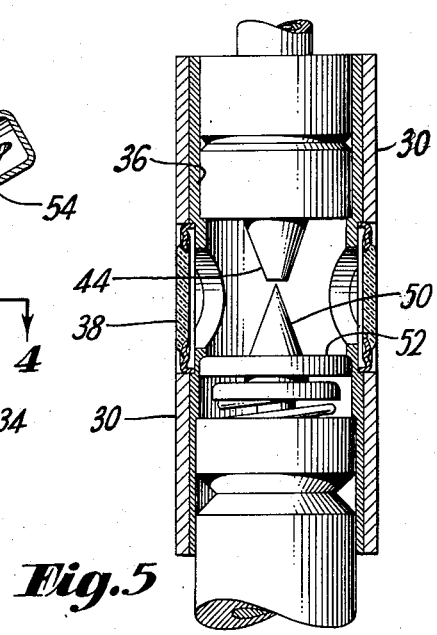

The illustrative embodiment described below is shown in detail in the accompanying drawings, wherein:

Fig. 1 is a slightly reduced lateral view of a prior art T-R tube, and Fig. 2 is a similar view of a T-R tube embodying the present invention;

Fig. 3 is an enlarged longitudinal cross-sectional view of the device in Fig. 2; and Figs. 4 and 5 are cross-sectional views of the device in Fig. 3 along the lines 4—4 and 5—5 therein.

Referring to Fig. 1, wherein the prior art T-R tube is shown, a virtually solid body portion 10 is shown having a window 12 in a wall or flange 14 and containing a resonator across which discharge may take place during operation between electrodes 16 and 18. Terminal 20 has a glass-sheathed lead 22 to a keep-alive electrode (not shown) within electrode 16. The rear wall of the device opposite wall or flange 14 also embodies a window, so that high frequency energy can be transmitted through the T-R tube. The resonator contains a volume of gas and when a high level burst of energy is impressed on one window it causes discharge between electrodes 16 and 18. Transmission through the resonator during such discharge is virtually prevented. Low levels of energy impressed on one window are transmitted without substantial change through both windows.

A reservoir 24 having a glass exterior for insulation between terminal 20 and the metallic body 10 has a passage along the keep-alive electrode to the resonant cavity. This reservoir is required for reasonably long life of the tube, for renewing the gas in the resonator that deteriorates with operation. The reservoir, however, makes the device fragile and unduly bulky. The new construction retains the reservoir while making the device more compact and rugged. The improved device is shown in Fig. 2 for comparison and is shown in the remaining figures at a larger scale for detailed examination.

In Fig. 4 a pair of flanges or walls 30 are shown spaced apart by a substantially cylindrical wall 32 to afford spaces 34 on opposite sides of resonator 36. The wall of resonator 36 is initially formed of a separate cylindrical member which is brazed, or otherwise suitably united to the remainder of the metallic structure in a vacuum-tight connection. Windows 38 are sealed across central openings in flanges 30 as by brazing, these windows being of glass with somewhat yielding metal flanges.

Keep-alive electrode 40 having a glass sheath 42 extends concentrically within a conical discharge electrode 44, keep-alive electrode 42 terminating slightly short of the lower limit of electrode 44. The glass sheath extends along the lead-in conductor of the keep-alive electrode so as to form an insulating vacuum seal 46 between keep-alive terminal 48 and the metal body of the device. It will be understood that the keep-alive electrode 40 and discharge electrode 44 are prepared as a multipart sub-assembly that is inserted into cylinder 36 bounding the resonator, discharge electrode 44 also constituting a portion of that resonator.

An additional discharge electrode 50 is disposed axially opposite the assembly of keep-alive electrode 40 and discharge electrode 44. Electrode 50 is supported on a yieldable wall 52 that is brazed to form a vacuum-tight-closure across cylinder 36 and is axially adjustable for tuning purposes by means of a compound screw and spring mechanism not pertinent to the present invention.

A potential difference is maintained between keep-alive electrode 40 and discharge electrode 44 so as to maintain a small ionized volume of gas at the tip of the keep-alive electrode. This conditions the tube for breaking down in a discharge across the resonator between electrodes 44 and 50 when a high level burst of energy is impressed on one of the windows 38. This so affects the waveguide system that supplies the energy that virtually none of the impressed energy is transmitted beyond the second window.

The resonator is filled with a mixture of argon and water in the ratio of five to three for a total pressure of 25 mm. in one example, or hydrogen and water in equal parts for a total of 15 mm. in another example, although the composition of the gas fill is subject to a wide variation, as is understood by those skilled in the art. For the purpose of exhausting and then filling the resonator and the reservoir, an exhaust tubulation 54 is provided. Paired apertures 56, 58 are provided for communication between the resonator and each portion of the reservoir 34. When discharge takes place between electrodes 44 and 50, the gas pressure within the reservoir rises momentarily, due to heating, and this rise of pressure forces some gas out through the apertures 56 and 58; and when the discharge ceases, there is a decrease in pressure within the resonator and gas is admitted readily from the reservoir. Due to the arrangement of openings, it is believed that the gas tends to leave by way of holes 58 and return mainly by way of openings 56. For periods between pulses normal diffusion also provides gas transfer.

It might be expected that the gas in the reservoir sections that is exposed to metal surfaces just as directly as the gas within the resonator would deteriorate and would therefore be ineffectual to replenish the deteriorated gas of the resonator. However, it has been found in experience that this is not the case, and that the reservoir between walls or flanges 30 is fully as effective as the fragile glass reservoir in Fig. 1, presuming equal reservoir volumes. The reservoir volume in Fig. 3 is approximately four times that of the cavity resonator, and appears to be reasonably sufficient.

In use of the device, a waveguide is abutted against each wall or flange 30, and by means of bolts (not shown) that extend along depressions 60 in the exterior of wall 32, the waveguide flanges are tightly clamped against the tube. This is necessary in order to prevent leakage of energy out of the joint between the waveguide and the respective walls 30. The waveguides conventionally are filled with gas under pressure that is substantially greater than atmospheric pressure, and the tight clamp also prevents leakage of this gas. The mechanical stress thus imposed which tends to crush the device is effectively resisted by the spaced walls 30 that are stiffened by the cylindrical outer wall 32 of the reservoir, and to some extent by the central resonator structure.

It will be recognized that the foregoing construction is subject to a latitude of rearrangement and varied application, and consequently it is appropriate that the appended claim be accorded a latitude of interpretation consistent with the spirit and scope of the invention.

What I claim is:

A waveguide transmission-control tube including spaced parallel metal flanges against which waveguide ends may be clamped, opposed high frequency transmitting windows joined centrally in said flanges, a cavity resonator embodying an opposed pair of discharge electrodes between said windows, one of said discharge electrodes being hollow and having an open end adjacent the other of said discharge electrodes, an insulated keep-alive electrode within said hollow electrode and having an end portion adjacent said open end, the opposite end of the keep-alive electrode having an external terminal portion closely adjacent the exterior of the tube and having a glass-to-metal seal thereto, and a wall between the edges of said flanges enclosing a reservoir space exterior of said resonator, said reservoir and said cavity containing an ionizable gas and having small gas passages between them, the volume of said reservoir being several times that of said cavity resonator.

References Cited in the file of this patent

UNITED STATES PATENTS

| Number | Name | Date |
|---|---|---|
| 2,444,303 | McCarthy | June 29, 1948 |
| 2,456,563 | McCarthy | Dec. 14, 1948 |
| 2,525,468 | Alpert | Oct. 10, 1950 |
| 2,587,305 | Fiske | Feb. 26, 1952 |
| 2,644,139 | Hunter | June 30, 1953 |